Oct. 4, 1938.  W. AYRES  2,131,911
LIGHT SENSITIVE DEVICE
Filed Aug. 20, 1935  2 Sheets-Sheet 1
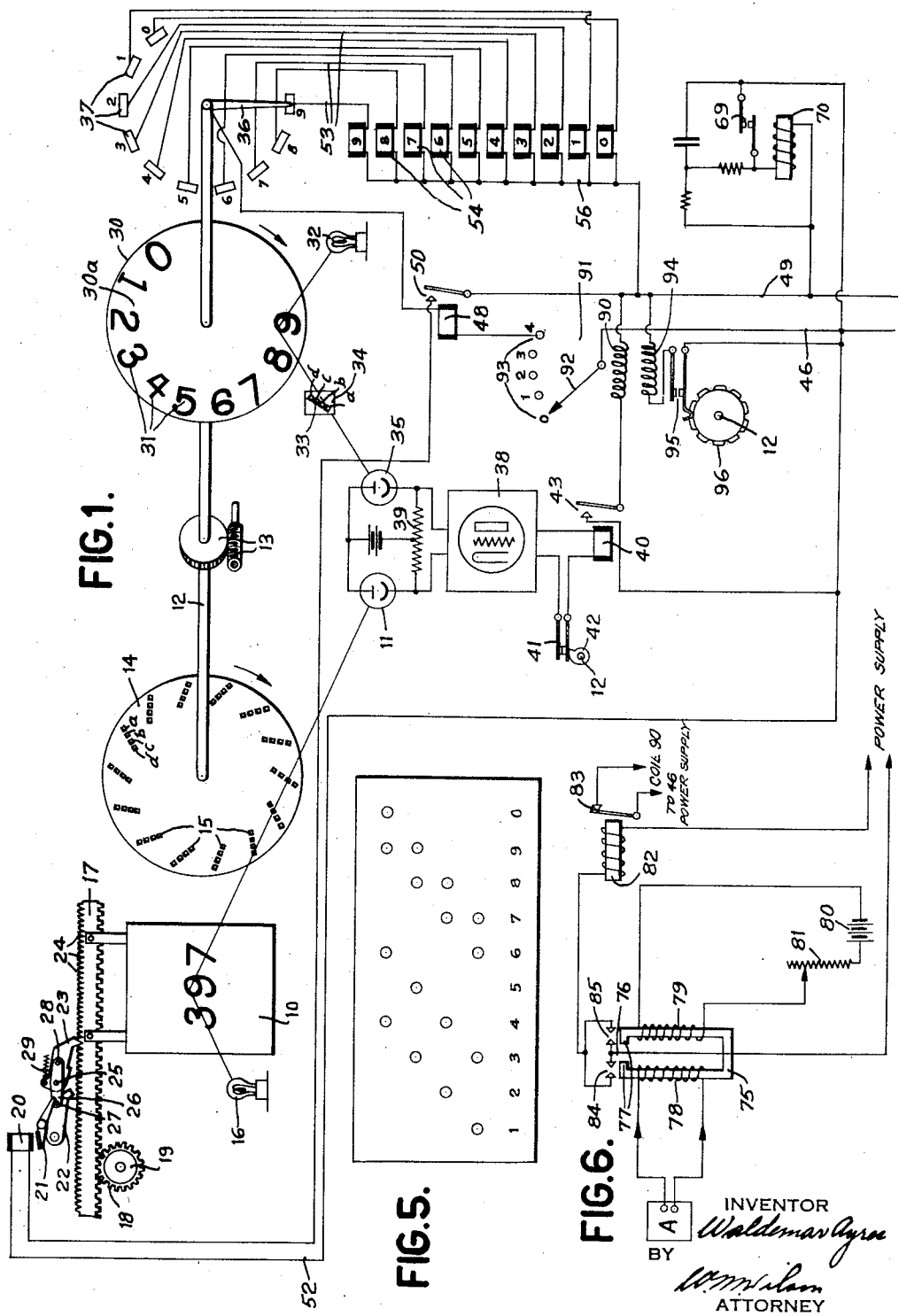
INVENTOR
Waldemar Ayres
BY
W. W. Wilson
ATTORNEY Oct. 4, 1938.   W. AYRES   2,131,911
LIGHT SENSITIVE DEVICE
Filed Aug. 20, 1935   2 Sheets-Sheet 2

INVENTOR
Waldemar Ayres
BY
ATTORNEY

Patented Oct. 4, 1938

2,131,911

UNITED STATES PATENT OFFICE 2,131,911

LIGHT SENSITIVE DEVICE

Waldemar Ayres, Binghamton, N. Y., assignor to International Business Machines Corporation, New York, N. Y., a corporation of New York Application August 20, 1935, Serial No. 37,049

4 Claims. (Cl. 250—41.5)

This is a continuation in part of application Serial No. 716,919, filed March 22, 1934.

This invention relates to a device to enable the reading of indicia representing intelligence with a light sensitive system capable of controlling auxiliary systems or mechanisms. It is particularly adaptable to control mechanisms such as tabulating machines, computing machines, adding machines, typing machines, printing machines, registers or the like, etc.

An important object of the invention is to provide a light sensitive device wherein a plurality of light sensitive cells are so disposed that a small difference in the illumination affecting them so destroys their balance so as to cause them to control remote equipment accordingly.

Another important object of the invention is to provide a method of using master control indicia prepared or recorded by the same method or mechanism preparing or recording the analyzed indicia.

A further object of the invention is to provide for the use of separate light sensitive cells for the scanned master indicia and analyzed indicia so arranged that only the net difference of the currents from the cells are used or amplified for control purposes.

A further object of the invention is to provide for simultaneous scanning of the master indicia and analyzed indicia by the fractional method, and scanning one part of the indicia of the analyzed indicia while the total indicia of the master indicia is scanned in turn.

A further object of the invention is to provide for operation of the control system when a neutral current value is the resultant from the simultaneous scanning operation of the indicia.

A further object of the invention is to provide for the use of relays or grid glow tubes or the like in such a manner as to pass current to the controlled mechanism when two like indicia are scanned simultaneously.

A further object of the invention is to provide for mechanism operating in synchronism with the master indicia scanned to distribute the current to the proper circuits in the controlled mechanism upon operation of the control system.

Various other objects and advantages of my invention will be obvious from the following particular description of one form of mechanism embodying the invention or from an inspection of the accompanying drawings, and the invention also constitutes certain new and novel features of the construction and combination of parts hereinafter set forth and claimed.

In the drawings:

Fig. 1 is a diagrammatic view showing the circuit connections and some of the parts of the device.

Fig. 5 is a preferred combinational code for numeral characters.

Fig. 6 is one form of modification of the relay system as shown in Fig. 1.

Figure 3:
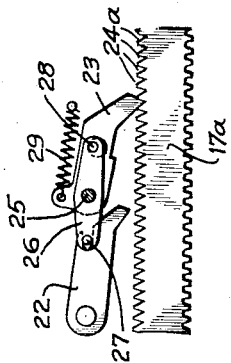
Fig. 3 is a detail of the punch carriage escapement mechanism.

In order to understand the significance of the instant invention, it should be borne in mind that such devices are adapted to be operated from a set of master controls of some kind. Of all possible types, it would appear that the least expensive, the most accurate (insofar as corresponding to the indicia analyzed as to the type and style of the indicia, printing or formation intensity, and light transmission and reflection characteristics of the paper or other agency to bear the indicia) and the most easily changed set of master controls (so as to correspond to changed indicia of the analyzed indicia) is a set of master controls consisting of indicia printed or prepared by the same agency preparing the indicia to be analyzed.

Another feature of the instant invention is the provision of the fractional and simultaneous scanning of the master and analyzed indicia. In the fractional method of scanning used the problem of differentiating between similarly formed indicia, where the amount of light is the criterion, is overcome, as for instance the nuerals 6 and 9. The method to be disclosed reacts to the differences in the shapes of the indicia in terms of the amount of light from the parts of the entire indicia scanned, so that the system sub-divides the indicia into a series of minute areas so that scanning is greatly refined in its exactness, as compared with a method of scanning the whole of the indicia. The differences in shape of the indicia are not self-canceling, as they would be in a method of scanning the whole of the indicia. Thus a maximum of efficiency in scanning is obtained, which is highly important for differentiating between two very similar characters which are in reality different, such as an 8 and a 3, or an 8 and 9, a 6 and 9, and a 5 and 3.

The indicia of the analyzed and master or compared indicia are simultaneously scanned and each part of the master indicia, in turn, is scanned while one part of the analyzed indicia is scanned. The light sensitive elements are so arranged as to respond to differential illuminating effects and the light from a single source or a plurality of sources energizing a separate light sensitive element, such for example as a photo-electric cell, and so arranged by using circuits which obtain the net difference between the current passing through one photo-cell and that passing through the other, rather than amplifying both currents and trying to obtain the difference between them. This provides a method of balancing current values instantaneously, without loss of electrical energy and with mathematical exactitude.

The accuracy of any photo-electric reading or comparing system is dependent entirely upon the positiveness with which it can distinguish between indicia quite similar, but in reality different as for example, the numeral characters 3 and 8. The numerals 3 and 8 are two characters difficult to distinguish (more so in some of the other type styles). Suppose that the 3 passes 105 units of electricity from one photo-electric cell, and that the 8 passes 100 units from the other cell. The former in comparison is 5% greater than the latter. In amplifying each of these values a number of times and comparing the amplified values, the 3 is still only 5% greater than the 8. However when using cells in circuits where the net difference between the currents passing through the cells is amplified, then using the same units as above the difference of the two is 5 units, and when this unit is amplified a number of times the difference is tremendous.

From this analysis, it appears that by using circuits where the net currents are amplified, any margin of reaction desired between similar characters is possible.

Referring now to Fig. 1, interposed between the data sheet 10 and photo-electric cell 11 and mounted on shaft 12 adapted to be rotated in the direction as shown by gears 13 is the scanning disk 14 having a number of apertures smaller than the character scanned. One form as shown in the drawings containing groups of four minute apertures 15 spaced equidistantly according to spacing of the characters and arranged on the disk so as to scan the character both vertically and horizontally in a manner similar to that of the well known television scanning disk. The number of groups of apertures 15 as shown correspond to the total number of different numeral characters to be scanned, but can vary as to the number contained on the disk so long as the disk 14 is synchronized properly with respect to the master control sheet and data sheet. The data sheet 10 is positioned so that the light source 16 will illuminate the characters thereon and its rays will either be transmitted through the sheet or as shown reflected from the sheet through one of the corresponding apertures 15a, b, c or d to the photo-cell 11. It is obvious that for every different character illuminated, a corresponding and varying quantity radiant energy will be transmitted to the photo-cells, and that this variance will effect the current generating or conducting properties of the cells accordingly.

When the character scanned on the data sheet corresponds to the character scanned on the master sheet, the photo-cell circuits are so arranged as to operate a control circuit, as will be explained hereinafter. At the occurrence of this condition data sheet 10 is adapted to be moved to the left, so as to present the next character to be scanned, by the carriage rack 17, suitably supported and guided, having teeth cut in its lower edge meshing with a gear 18 upon whose axis is mounted a spring barrel 19 which through connection to the gear 18 tends to urge the rack 17 toward the left. A suitable escapement mechanism adapted to be operated, when like characters are scanned, by armature 21 of magnet 20 cooperating with pin 27 to rock it in a counter-clockwise rotation thereby tilting a double-armed lever 26. (See Fig. 3 for similar lever arrangement applied to another similar carriage rack.) Lever 26 has a pin 27 in one arm which extends into pawl 22, and a pin 28 in its other arm which extends into an enlarged opening in pawl 23, cooperating with ratchet shaped teeth 24 cut in upper edge of carriage rack 17 to permit step-by-step advance thereof. As the lever 26 is rotated, the pin 27 will lower pawl 22 into engagement with a tooth 24 to hold rack 17 in position while pin 28 raises pawl 23 out of cooperation with the bar. Pawl 23 is loosely mounted on the shaft 25 with sufficient clearance so that upon return of lever 26 to its initial position, pawl 23 will be drawn slightly to the right by its spring 29 and the next tooth on the rack will engage the end of the pawl.

Mounted on shaft 12 and rotating in direction as shown in disk 30 adapted to carry the master control characters 31 spaced in accordance with the aperture group spacing on disk 14 and rotated synchronously therewith. The characters 31 illuminated by rays of light from a source 32 adapted to be transmitted through or reflected as shown from the sheet 30a through apertures 33 (a, b, c, d) in stationary plate or disk 34 to photo-cell 35. The apertures 33 are of the same size and arranged similarly to the apertures 15, so that the same parts of the characters on both the data and master sheets are scanned simultaneously. However, this master control arrangement can be varied so that the master disk 30 is fixed and having the aperture disk 34 rotate. Arm or brush 36 is fixedly mounted on the shaft 12 and adapted to wipe the contacts 37 corresponding to the character scanned and to remain in contact therewith until the entire character is scanned, so that when like characters are scanned, its corresponding control circuit is adapted to be operated accordingly, as will be explained later.

The light sensitive cells, a type of which are the direct current generating photo-cells 11 and 35 are connected so that the currents generated by the two cells will be opposed to each other and only the net difference of these currents will be amplified by the thermionic tube 38 with its input and output terminals connected in the conventional manner.

It is to be noted that while only two cells 11 and 35 are shown, circuits including any number of photo-cells connected in any desirable manner are within the range of equivalents of my invention, and of course connected so that certain of them pass current in one direction, while the remainder pass current in the opposite direction.

A high resistance 39 is connected across the photo-cell circuit forming the input into the amplifier 38 to increase the sensitivity and effectiveness of the photo-cells. The amplifier 38 is designed to energize the relay 40 through the normally closed contacts 41 when a current balance is obtained from the photo-cells 11 and 35.

The contacts 41 are operated by the cam 42 positioned on shaft 12 and arranged to maintain the contacts in a closed or operated position during the period the characters on the master card are scanned. Therefore it is seen that each time the scanned areas correspond so that the degree of light transferred to each of the cells 35 and 11 from the master record and compared sheet is equal, a balanced current condition exists in the amplifier input circuit to effect energization of relay 40. Current is conducted through the relay contacts 43 to energize the stepping relay coil 90 stepping its brush arm 92 from one contact 93 to its adjacent contact. Stepping relay 91 is of the well known type and needs no further detailed description. However, a complete disclosure may be had in Patent No. 2,113,611 granted April 12, 1938 to Vernon M. Bugge.

The associated coil 94 is adapted, upon energization, to return the brush arm 92 to its normal position as shown in the figure, i. e., resting on contact 93. Contact 93—4 of relay 91 is connected to relay 48 so that current is conducted thereto through lead 46 when brush arm 92 rests on contact 93—4, the circuit extending from relay 48 to brush arm 36, a corresponding segment 37 and magnet 54 to conductor 49. Upon energization of relay 48 current is conducted from lead 49, contacts 50, to magnet 20. Magnet 20 is adapted to be slow acting, so that the circuits to be controlled by magnets 54 are completed before the armature 21 is attracted and cooperates with pin 27 to effect positioning a different character to be analyzed by photo-cell 11.

It was described that the fractional method of scanning was used and by way of example the character divided and scanned by the four apertures of the said disks. Therefore when like characters are scanned four similar areas are scanned for the whole character and obviously relay 40 is energized four times to close the described circuit to coil 90 of the stepper relay 91 to step brush 92 to contact 93—4, thereby conducting current from the power source and through relay 48 and brush 36 through a contact 37 to a corresponding magnet 54. Contacts 95 controlled by cam 96 mounted on shaft 12 has arranged thereon high surfaces to close the contacts upon complete scanning of an entire character on disk 30 so that before comparing another character on the disk with a character on record 10, the brush 92 is positioned on contact 93, by virtue of the cam controlled contacts 95 energizing the coil 94 thereby positioning the brush to its normal position.

As mentioned hereinbefore arm 36 engages one of the contacts 37 when any one of the corresponding characters on disk 30 are scanned, so that when the scanned characters of disk 30 and sheet 10 are alike one of the circuits corresponding to engaged contact is closed.

One of the terminals of each of the magnets 54 comprising part of the controlled mechanism are separately connected to the contacts 37 and the other terminals by a common line 56 are connected to one line 49 of the power source, thus providing a separate circuit for each of the magnets 54 in the controlled mechanism to perform separate functions.

Figure 2:
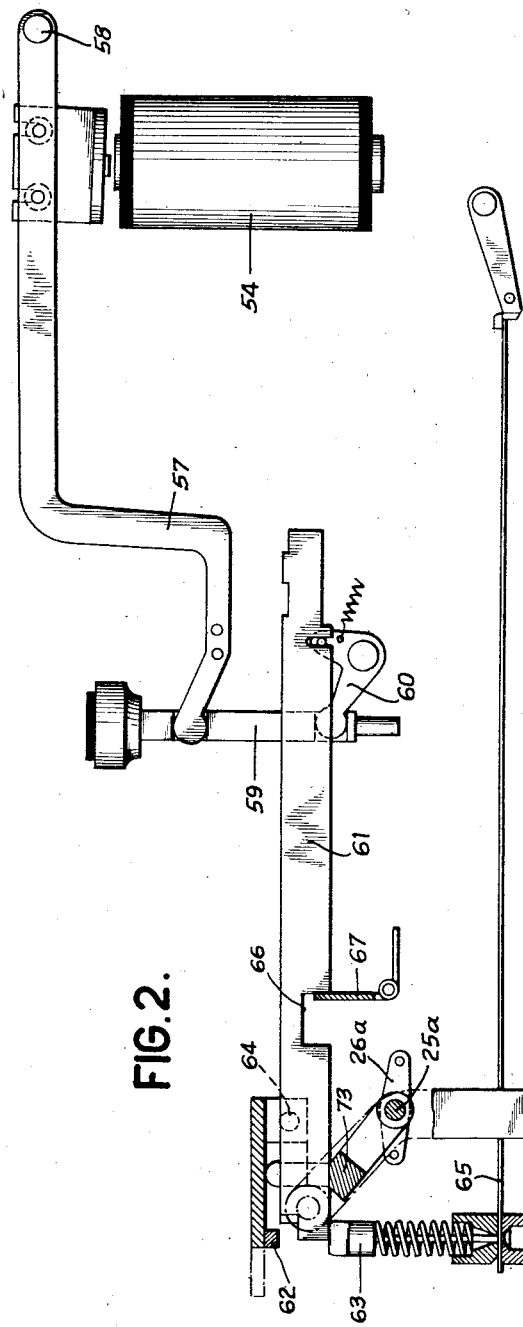
Fig. 2 is a section of the essential operating mechanism of the controlled device, a punch.

One form of mechanism to be controlled is shown in Fig. 2, which is a punching device generally of the form shown in the Lee and Phillips Patent No. 1,772,186, granted August 5, 1930, and the following description thereof will be limited to the essential features.

Figure 4:
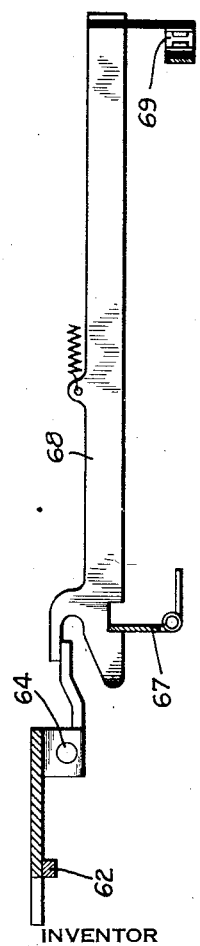
Fig. 4 is a detail of a punch magnet operating contact mechanism.

Energization of the punch selecting magnet 54, there being one for each index point position of the record card, will attract its armature to rock an arm 57 in a counterclockwise direction about its pivot 58, thus moving key 59 downwardly to rock a bell crank 60 cooperating with an interposer 61 which is suitably mounted for horizontal reciprocation. The forward end of the interposer is suitably guided between an operating bar 62 and the upper end of a punch 63. Forward movement of the interposer will position its widest portion between bar 62 and punch 63 so that subsequent counterclockwise rocking of bar 62 about pivot 64 will move the interposer and punch downwardly to perforate the record card 65. A notch 66 in the interposer cooperates with a bail 67 to rock the same in a counterclockwise direction when the interposer is moved toward the left. Rocking of bail 67 in such manner will draw a hook-shaped member 68 (see Fig. 4) toward the left to close a pair of contacts 69 which then complete a circuit through the punch magnet 70 (see Fig. 1) causing it to attract its armature 71 and through linkage, generally designated 72, draw downwardly on the bar 62 to cause depression of the selected punch. Depression of key 59 may, of course, be effected independently of the operation of the magnet 54 for the purpose of manually controlling punching operations.

Disposed beneath the interposers 66 is a bail 73 which is carried by shaft 25a upon one end of which is secured an arm 26a for operating the escapement mechanism for the card carriage rock. The operation of the escapement mechanism was disclosed hereinbefore in connection with Fig. 3. The mechanisms are similar and its operation therefore need not be repeated.

From the description hereinbefore, it is seen that both the data and master sheet are illuminated and that the rays from the light source are transmitted from the data sheet 10 and the master sheet 30a to separate photo-cells 11 and 35 respectively. A character on the data sheet 10 is scanned by means of the apertures 15 which are smaller than the character scanned and so arranged on the disk 14 that each part of the character is scanned successively by a corresponding aperture. This scanning of the character on the data sheet 10 and of the character on the master sheet 30a is simultaneous, and for a single character on the data sheet the complete set of characters on the master sheet are scanned until like characters are scanned. The master sheet 30a is rotated synchronously with the disk 14 so that when a character is scanned on the master sheet the disk 14 is scanning the character on the data sheet, with the apertures on the disk 34 so arranged that the corresponding sectional parts of the characters are scanned simultaneously, so that when two characters, one on the master sheet and one on the data sheet, are scanned that are identical, the light rays transmitted to the corresponding photo-cells would cause the same current values to be generated in the cells.

When unlike characters are scanned the current values generated by the cells are unequal, and as explained before, the fact that the cells are connected so that the generated currents are opposed to each other only the net difference of these currents are adapted to control the device, and in this one embodiment the resultant current is shown to be amplified by the conventional thermionic tube 38 to control the relay 40. Energization of relay 40 causes the stepper relay to be operated to step the brush 92 ahead one contact. When the total areas are scanned and the whole characters are similar the brush is advanced to contact 93—4 to energize relay 48 and by virtue of the contact 37 engaged by the brush area 36 and corresponding to the matched characters, the magnet 54 corresponding to the matched character is energized to effect punching of the card in a manner described previously. Energization of relay 48, as disclosed, causes the data card carriage escapement mechanism to operate allowing the presentation of the next character on the data sheet to be scanned in a similar manner. Since such spacing would occur only when characters on the data sheet and master sheet were matched, failure to space would indicate that the device needed adjustment, that two characters on the data sheet were superimposed, that a character had been crossed out, or that some other special condition had arisen requiring attention.

Furthermore, when this device is used in connection with a punch as described, this relay to control spacing will keep the record card so that the column being punched corresponds with the character being scanned on the data sheet.

It is obvious that the device disclosed is adapted to analyze other forms of indicia, for example, a combinational code as shown in Fig. 5 representing numerals, where each index point position representing the numeral is scanned by an individual aperture on the disks 14 and 34, to cause, in like manner, the generation of currents in photo-cells 11 and 35 to control remote apparatus.

In Fig. 6 a modification of my invention is shown wherein a relay 75 having an armature 76 balanced between two opposed pole pieces 77 with one winding 78 being energized by the output of a current generating device A such as a suitable amplifier system, wherein the currents generated have a certain neutral value when the currents in the photo-cell circuits are balanced and with all other values of current greater and less than this neutral value for unbalanced conditions in the photo-cell circuits. The winding 79 is energized by a power source 80 adjusted by rheostat 81 so that its current causes the winding to be energized so as to counterbalance the energization of the winding 78 by the amplifier current corresponding to a balanced condition of the photo-cells thereby causing the armature 76 to be in a neutral position as shown in the figure. During this condition the relay 82 is de-energized allowing current from a power source to flow through contact 83 to the coil 90 of relay 91 and as explained hereinbefore to control the remote apparatus accordingly.

When the winding 78 is energized by a current greater than the neutral value, a circuit is established through windings of relay 82 by the closing of contacts 84, causing the circuit to the coil 90 to be broken at contact 83 due to energization of relay 82 attracting its armature.

The same open circuit condition to the coil 90 is obtained when the winding 78 is energized by a current less than the neutral value since the armature 76 is then attracted to contact 85 by virtue of the energization of winding 79 which in this condition is greater than the energization of winding 78 causing the relay 82 to be energized attracting its armature and maintaining an open circuit. Relay 82 is so adjusted as to be unaffected by current variations during the period required for the armature travel from contact 84 to 85. It is to be noted that the relay 75 has only symbolical significance, and that any electrical device of another type, such as grid glow tube combinations, is within the scope of my invention.

While there has been shown and described and pointed out the fundamental novel features of the invention as applied to the several modifications, it will be understood that various omissions and substitutions and changes in the form and details of the devices illustrated and in their operation may be made by those skilled in the art without departing from the spirit of the invention. It is the intention therefore to be limited only as indicated by the scope of the following claims.

What is claimed is as follows:

1. In a device of the class described, means for introducing separate records bearing characters to the device, a movable member having a series of different characters similar thereto, means for scanning said characters comprising means to scan fractional areas of the entire characters successively, a plurality of photo-electric devices for converting variations in the intensity of light from said characters as determined by the scanning action into varying electric currents, means controlled by said current variations each time the fractional areas of the characters scanned are similar, and means controlled by the last named means and operated only when all the successively scanned areas of the characters are similar.

2. In an indicating device of the class described, means for introducing separate records bearing characters to the device, a movable member having a series of different characters similar thereto, means for scanning said characters comprising means to scan fractional areas of the entire characters successively, a plurality of photo-electric devices for converting variations in the intensity of light from said characters as determined by the scanning action into varying electric currents, a plurality of control means corresponding to the said characters, means controlled by said current variations each time the fractional areas of the characters scanned are similar and means controlled by the last named means and operated only when all the successively scanned areas of the characters are similar to control the operation of one of the said control means.

3. In an indicating device of the class described, means for introducing separate records bearing characters to the device, a movable member having a series of different characters similar thereto, means for scanning said characters comprising means to scan fractional areas of the entire characters successively, a plurality of photo-electric devices for converting variations in the intensity of light from said characters as determined by the scanning action into varying electric currents, a plurality of control means corresponding to the said characters, means operated in synchronism with said movable member and adapted to select one of the said control means corresponding to the character being scanned on said member, means controlled by said current variations each time the fractional areas of the characters scanned are similar, and means controlled by the last named means and operated only when all the successively scanned areas of the characters are similar to control the operation of the said control means corresponding to the characters indicated to be similar.

4. In an indicating device of the class described, means for introducing separate records bearing characters to the device, a movable member having a series of different characters similar thereto, means for scanning said characters comprising means to scan fractional areas of the entire characters successively, a plurality of photo-electric devices for converting variations in the intensity of light from said characters as determined by the scanning action into varying electric currents, a plurality of control means corresponding to the said characters, means controlled by said current variations each time the fractional areas of the characters scanned are similar, and means controlled by the last named means and operated only when all the successively scanned areas of the characters are similar to control the operation of one of the said control means, and means adapted to control the first named means to introduce another character to be scanned upon the operation of the said control means.

WALDEMAR AYRES.